United States Patent
Billet et al.

(10) Patent No.: US 8,774,408 B2
(45) Date of Patent: Jul. 8, 2014

(54) TRACEABLE METHOD AND SYSTEM FOR BROADCASTING DIGITAL DATA

(75) Inventors: Olivier Billet, Tourrettes sur Loup (FR); Ryad Benadjila, Paris (FR)

(73) Assignee: Orange, Paris (FR)

( * ) Notice: Subject to any disclaimer, the term of this patent is extended or adjusted under 35 U.S.C. 154(b) by 389 days.

(21) Appl. No.: 13/000,305

(22) PCT Filed: Jun. 23, 2009

(86) PCT No.: PCT/FR2009/051199
§ 371 (c)(1),
(2), (4) Date: Dec. 20, 2010

(87) PCT Pub. No.: WO2010/004162
PCT Pub. Date: Jan. 14, 2010

(65) Prior Publication Data
US 2011/0116630 A1        May 19, 2011

(30) Foreign Application Priority Data

Jun. 25, 2008   (FR) ...................................... 08 54236

(51) Int. Cl.
*H04L 9/20*        (2006.01)
*H04L 9/08*        (2006.01)

(52) U.S. Cl.
CPC ................................... *H04L 9/0836* (2013.01)
USPC ........................................ 380/268; 380/30

(58) Field of Classification Search
USPC ................................................ 380/268, 277
See application file for complete search history.

(56) References Cited

U.S. PATENT DOCUMENTS 7,697,680 B2    4/2010  Arditti Modiano et al.

FOREIGN PATENT DOCUMENTS

FR            2856539 A1    12/2004

OTHER PUBLICATIONS

Goldreich et al., "How to Construct Random Functions", Journal of the Association for Computing Machinery, Oct. 1986, 33(4):792-807.

*Primary Examiner* — Gilberto Barron, Jr.
*Assistant Examiner* — Devin Almeida
(74) *Attorney, Agent, or Firm* — Drinker Biddle & Reath LLP

(57) ABSTRACT

A method and system for a user to obtain a derived value $K_r$ of m bits, in which, given two pseudo-random functions $g_0$ and $g_1$ from m bits to m bits, said user obtains, on the basis of an input parameter consisting of a word r of n bits, a derived value $K_r = g_{r_n} \circ \ldots g_{r_2} \circ g_{r_1}(S)$, where, for $i=1, \ldots, n$, $g_{r_i} = g_0$ if $r_i = 0$, and $g_{r_i} = g_1$ if $r_i = 1$, and where S is a master value of m bits which is not disclosed to said user. This method comprises the following steps: a search is conducted, from among a set of words of m bits $U_j$, where $j=1, \ldots, p$, recorded in a table $T^U$ and equal to $U_j = g_{v_{l(j)}^{(j)}} \circ \ldots g_{v_2^{(j)}} \circ g_{v_1^{(j)}}(S)$, where, for $i=1, \ldots, l(j)$, the indices $v_i^{(j)}$ are predetermined bits, for a word $U_\sigma$ equal to $U_\sigma = g_{r_{l(\sigma)}} \circ \ldots g_{r_2} \circ g_{r_1}(S)$; said derived value $K_r$ is thereafter obtained by calculating $K_r = g_{r_n} \circ \ldots g_{r_{l(\sigma)+1}}(U_\sigma)$. Application to the encryption/decryption of pay-per-use digital contents, and to authentication.

7 Claims, 2 Drawing Sheets

TRACEABLE METHOD AND SYSTEM FOR BROADCASTING DIGITAL DATA

CROSS-REFERENCE TO RELATED APPLICATIONS

This application is the U.S. national phase of the International Patent Application No. PCT/FR2009/051199 filed Jun. 23, 2009, which claims the benefit of French Application No. 08 54236 filed Jun. 25, 2008, the entire content of which is incorporated herein by reference.

FIELD OF THE INVENTION

The invention relates to a method and a system for broadcasting digital data. This method and this system are traceable, and resistant to white-box attacks.

BACKGROUND

In the context of the deployment of communications networks and audiovisual services, the distributing of digital contents is becoming problematic from the standpoint of intellectual property rights. This is because the copying of digital data in very large quantities, as well as their large-scale redistribution, has become both easy and inexpensive for individuals. For example, industries whose profits rely on the provision of digital data (such as music, video, electronic books, games software, and so on and so forth) desire to protect these digital data against use outside the framework defined by a commercial contract between digital content provider and consumer; this is the object of Digital Rights Management (DRM). The article by P. C. van Oorschot entitled "*Revisiting Software Protection*" (Proceedings of the 6$^{th}$ "*Information Security*" International Conference, pages 1 to 13, Springer-Verlag, 2003) may be consulted for a general presentation of the problems related to software protection.

To combat the fraudulent redistribution, by one or more legitimate consumers of content, of the secret identifiers, or of the decoding software itself, contained in their decoding equipment ("decoder", or "set-top box" in English)—this redistribution allowing illicit consumers (called "pirates") to access the plaintext contents—so-called "traitor tracing" methods are implemented. The concept, and certain techniques, of traitor tracing were proposed by B. Chor, A. Fiat and M. Naor in their article entitled "*Tracing Traitors*" (Advances in Cryptology—Crypto'94, Lecture Notes in Computer Science, vol. 839, pages 257 to 270, Springer-Verlag, 1994).

Methods for tracing traitors guarantee that, if such a fraud occurs, the identity of at least one of the legitimate consumers who are the instigators of the fraud (termed "traitors") may be reconstructed by the contents provider (or by a control authority) on the basis of the data redistributed to the illicit consumers. Encryption/decryption systems in which a method for tracing traitors may be implemented are termed "traceable".

These techniques are customarily of a combinatorial nature, that is to say each legitimate content consumer is allotted a personal secret identifier forming part of a set (generally fairly large) of secret identifiers. The data broadcast in this system comprise encrypted messages. Each encrypted message comprises:

a cryptogram $C_r(M)$ formed on the basis of a content M encrypted with the aid of a content encryption key dependent on a parameter r the value of which is periodically varied so as to vary said encryption key, and one or more header(s) containing certain information encrypted as a function of said identifiers.

The data broadcast in this system also comprise, as plaintext, the current value of said parameter r.

When a content consumer receives one of these messages, he decrypts said encrypted information with the aid of his personal identifier and of the parameter r. He then combines the information thus decrypted to obtain the key $K_r$ for decrypting the content, and then he uses this key $K_r$ for decrypting the content to decrypt said cryptogram $C_r(M)$. The key $K_r$ for decrypting the content is customarily called a "control word" in systems for pay-per-use consumption of broadcast audiovisual content.

In a "traceable" encryption/decryption system, if one of the legitimate consumers of content communicates his personal identifier to an illicit consumer, it is possible to retrieve the identity of the traitor on the basis of the personal identifier implemented by the illicit consumer.

However, methods for tracing traitors of a combinatorial nature exhibit the drawback that it is necessary to broadcast a considerable volume of headers.

European patent application No. 1 634 405 discloses a method for encrypting/decrypting broadcast digital data not requiring the broadcasting of a significant number of headers. According to this method:

during the encryption of the content to be broadcast, the sender implements at least one first secret cryptographic function, and during the decryption of the content, all the decoders implement at least one same second secret cryptographic function inverse to said first function, each decoder employing for this purpose a mathematical description of said second function recorded in a memory.

During the implementation of the second function, the mathematical description of this second function employed by each decoder is different from one decoder to another, in such a way that the mathematical description employed identifies in a unique manner each particular decoder from among all of the decoders.

In the method hereinabove, it is possible to retrieve a traitor who might have communicated the mathematical description of his second secret function to an illicit consumer, on the basis of the analysis of the mathematical description of this second function implemented by the illicit consumer to decrypt the transmitted data. This is because, by construction of each mathematical description of the system, said description is representative of the identity of the traitor.

Moreover, in the method hereinabove, by virtue of the fact that the identification of a traitor no longer relies on the implementation of personal identifiers, but on the implementation of different descriptions of one and the same cryptographic function, the number of headers necessary to broadcast an encrypted message is less than the number of headers necessary to broadcast the same message encrypted with the aid of a conventional combinatorial method.

However, the method succinctly described hereinabove presents the drawback that it offers only weak protection against so-called "white-box" attacks.

Indeed, for an unscrupulous user of decoding software, another way of behaving as a "traitor" than by redistributing his software consists in analyzing the main steps implemented in this software, so as to then be able to build forging software which is:

essentially equivalent to the copied software as regards its decryption capabilities, but sufficiently different from the copied software for this forgery to be difficult to detect by the contents provider (or a control authority). Furthermore, the forging software will be easier to distribute by the traitor than the copied software if the forging software is of smaller size than the copied software.

This context of piracy is called "white-box attack context", according to the article by S. Chow, P. Eisen, H. Johnson and P. C. van Oorschot entitled "*White-Box Cryptography and an AES Implementation*" (Proceedings of the "*International Workshop on Selected Areas in Cryptography*", Springer, pages 250 to 270, 2003), and in the article by the same authors entitled "*A White-Box DES Implementation for DRM Applications*" (Proceedings of the "Second ACM Workshop on Digital Rights Management", Springer, pages 1 to 15, 2003). This name highlights the difference between this context and the well known "black-box" context, in which a pirate seeking to analyze a piece of software can only observe pairs (input data)/(output data) associated with this software, without having access to the intermediate processing steps implemented by the software; in the context of a white-box attack conversely, the pirate can observe the dynamic execution of a piece of software step by step, and even modify instructions of this software so as to be able to study the consequences of these modifications on the processing performed by the software.

In particular, a white-box attacker can seek to retrieve the values of secret keys recorded in a piece of software, so as to use these secret keys in an equivalent piece of software available to the attacker (indeed, the algorithm implemented by the software is often known in its main steps), or on another computerized platform. The protection of these secret keys is therefore essential, but rendered all the more difficult as the cryptographic keys generally obey a very particular format which distinguishes them from the other recorded data, thus allowing a pirate to spot them fairly easily.

SUMMARY

The present invention therefore relates, firstly, to a method for the obtaining by a user of a derived value $K_r$ of m bits, in which, given two pseudo-random functions $g_0$ and $g_1$ from m bits to m bits, said user obtains, on the basis of an input parameter consisting of a word r of n bits, a derived value $$K_r = g_{r_n} \circ \ldots g_{r_2} \circ g_{r_1}(S),$$

where, for $i=1, \ldots, n$, $g_{r_i}=g_0$ if $r_i=0$, and $g_{r_i}=g_1$ if $r_i=1$, and where S is a master value of m bits. Said method is noteworthy in that said master value S is not disclosed to said user, and in that it comprises the following steps:

a search is conducted, from among a set of words of m bits $U_j$, where $j=1, \ldots, p$, recorded in a table $T^U$ and equal to $$U_j = g_{v_{l(j)}^{(j)}} \circ \ldots g_{v_2^{(j)}} \circ g_{v_1^{(j)}}(S),$$

where, for $i=1, \ldots, l(j)$, the indices $v_i^{(j)}$ are predetermined bits, for a word $U_\sigma$ equal to $$U_\sigma = g_{r_{l(\sigma)}} \circ \ldots g_{r_2} \circ g_{r_1}(S), \text{ and}$$

said derived value $K_r$ is obtained by calculating $$K_r = g_{r_n} \circ \ldots g_{r_{l(\sigma)+1}}(U_\sigma).$$

Thus, the invention uses, in particular, the construction—which we will call the "GGM construction"—proposed by O. Goldreich, S. Goldwasser and S. Micali in their article "*How to Construct Random Functions*", Journal of the ACM, vol. 33(4), pages 792 to 807, 1986. This construction assumes the existence of a predetermined pseudo-random generator which, for an input consisting of a seed x of m bits, produces an output word $y=(y_0, y_1)$ of 2m bits consisting of the words of m bits $y_0=g_0(x)$ and $y_1=g_1(x)$, thereby defining ipso facto two functions from m bits to m bits $g_0$ and $g_1$. The GGM construction then defines a function $F_k$ associated with a secret k of m bits in the following manner: with an input $v=(v_1, v_2, \ldots, v_n)$ of n bits, the function $F_k$ associates the word of m bits given by $$F_k(v) = g_{v_n} \circ \ldots g_{v_2} \circ g_{v_1}(k),$$

where, for $i=1, \ldots, n$, $g_{v_i}=g_0$ if $v_i=0$, and $g_{v_i}=g_1$ if $v_i=1$, and where the symbol "$\circ$" denotes the composition of functions.

It will be noted that the successive composition of the function $g_0$ or of the function $g_1$ may be conveniently viewed (see FIG. 1 hereinbelow) as a tree comprising n levels in which, starting from the "root" of the tree situated at the level zero, we consider pairs of "branches" issuing from "branch-offs" of the tree, one of the branches corresponding to the index 0 and the other to the index 1. The successive bits of the word v thus define a path within the tree. The number of branch-offs is doubled at each successive level, culminating, at level n, at the "leaves" of the tree. The secret k is then associated with the root, and the word $F_k(v)$ with the leaf at which the path defined by the word v culminates.

The user for whom the invention is pertinent may for example be a consumer (such as a subscriber) of digital contents which are provided to him by a trusted entity, itself consisting, for example, of a provider of digital contents. It will be noted that, within the framework of the present invention, the expression "trusted entity" may denote either the designer of a system for broadcasting digital values according to the invention, or else a broadcaster of encrypted messages, or else a control authority able to trace traitors among the users of a system for broadcasting encrypted messages implementing a method according to the invention.

A first advantage of the invention is that, if each user is provided with his own specific table $T^U$, each user's software is as it were "branded" by means of a characteristic mark making it possible, in the case of illicit redistribution of this software, to trace the traitor who is the instigator of this redistribution. Moreover, as explained in detail hereinbelow, the trusted entity can arrange the set of tables $T^U$ in such a way as to be able also to trace any table which makes it possible to obtain the derived values $K_r$, but obtained by a pirate by modifying a legitimate table $T^U$.

Moreover, it will be noted that the invention makes it possible to avoid the master value S being stored as such in the software provided to the user; this master value is not therefore, advantageously, accessible to a white-box analysis of a piece of software implementing the invention. Moreover, if the user can obviously obtain the derived values $K_r$ to which he is entitled by right, he may not calculate the master value S on which his table $T^U$ depends (that is to say, go back to the root of the tree), this being so because the functions $g_0$ and $g_1$ are pseudo-random, and therefore, in particular, one-way. It is therefore impossible for a traitor to build forging software which does not employ a table such as $T^U$ (and which is therefore outwardly different from the authorized software), but which is nonetheless able to calculate the derived values $K_r$.

A third advantage of the invention is that it requires only low calculational complexity as well as low storage capacity on the part of the users. In particular, it is nowadays known how to produce a pseudo-random generator in an electronic device by means of a circuit of relatively modest size (by implementing, for example, block encryption or else flow encryption).

Finally, a fourth advantage of the invention is that it requires, at the data broadcasting level, only a small volume of headers (constituted in this instance by the input parameter r).

Correlatively, the invention relates, secondly, to a device for the obtaining by a user of a derived value $K_r$ of m bits, comprising a pseudo-random generator producing two pseudo-random functions $g_0$ and $g_1$ from m bits to m bits, and making it possible to obtain, on the basis of an input parameter consisting of a word r of n bits, a derived value $$K_r = g_{r_n} \circ \ldots g_{r_2} \circ g_{r_1}(S),$$

where, for $i=1, \ldots, n$, $g_{r_i}=g_0$ if $r_i=0$, and $g_{r_i}=g_1$ if $r_i=1$, and where S is a master value of m bits. Said device is noteworthy in that said master value S is not disclosed to said user, and in that it comprises:

means for searching, from among a set of words of m bits $U_j$, where $j=1, \ldots, p$, recorded in a table $T^U$ and equal to $$U_j = g_{v_{l(j)}^{(j)}} \circ \ldots g_{v_2^{(j)}} \circ g_{v_1^{(j)}}(S),$$

where, for $i=1, \ldots, l(j)$, the indices $v_i^{(j)}$ are predetermined bits,
for a word $U_\sigma$ equal to $$U_\sigma = g_{r_{l(\sigma)}} \circ \ldots g_{r_2} \circ g_{r_1}(S), \text{ and}$$

means for obtaining said derived value $K_r$ by calculating $$K_r = g_{r_n} \circ \ldots g_{r_{l(\sigma)+1}}(U_\sigma).$$

The advantages offered by this device are essentially the same as those offered by the correlative method succinctly set forth hereinabove.

This device for obtaining a derived value will be able to take the form of an electronic circuit, in particular within a decoder.

This device for obtaining a derived value will also be able to take the form of a software platform executed by a computerized system. This computerized system, which comprises in a conventional manner a central processing unit controlling by signals a memory, as well as an input unit and an output unit, may be used to execute a computer program comprising instructions for the implementation of the method for obtaining a derived value according to the invention.

The invention is therefore also aimed at a computer program downloadable from a communication network and/or stored on a medium readable by computer and/or executable by a microprocessor. This computer program is noteworthy in that it comprises instructions for the execution of the steps of a method for obtaining a derived value such as succinctly set forth hereinabove, when it is executed on a computer.

The advantages offered by this computer program are essentially the same as those offered by said method.

As mentioned hereinabove, the present invention finds its application in particular within the framework of the distributing of pay-per-use digital contents. But it also finds a favored application within the framework of the transmission of encrypted messages; it will thus be possible, for example, to advantageously apply the invention to any conventional reliable and fast symmetric encryption algorithm, such as AES (English acronym for "Advanced Encryption Standard").

This is why the invention also relates to a method of decryption. This method is noteworthy in that it uses as decryption key a value that may be obtained on the basis of at least one derived value $K_r$, the latter being calculated by means of a method for obtaining a derived value such as described succinctly hereinabove, so as to decrypt a cryptogram $C_r(M)$ received jointly with said input parameter r, where M is a plaintext content and $C_r$ a predetermined encryption algorithm.

Likewise, the invention also relates to a method of authentication. This authentication method is noteworthy in that said first entity uses as secret key for authentication with a verificator entity a value that may be obtained on the basis of at least one derived value $K_r$, the latter being calculated by means of a method for obtaining a derived value such as described succinctly hereinabove, after reception of said input parameter r intended for such authentication.

The invention also relates to a computer program downloadable from a communication network and/or stored on a medium readable by computer and/or executable by a microprocessor, said program being noteworthy in that it comprises instructions for the execution of the steps of a decryption method such as described succinctly hereinabove, or of an authentication method such as described succinctly hereinabove, when it is executed on a computer.

The invention is also aimed at an information medium readable by a computer, and comprising instructions of a computer program such as described succinctly hereinabove.

BRIEF DESCRIPTION OF THE DRAWINGS

Other aspects and advantages of the invention will become apparent on reading the detailed description of particular embodiments, given hereinbelow by way of nonlimiting examples. The description refers to the drawings which accompany it, in which.

DETAILED DESCRIPTION

Within the framework of the present invention, the word "node" will be used to denote the information pair bound to a branch-off and consisting of:

the position, that we will call the "label of the node", of this branch-off in the tree, and the word of m bits, which we will call the "value of the node", bound to this branch-off.

In accordance with the invention, each user U is allotted his own specific table $T^U$. Such a table is a collection of p nodes, where p is a strictly positive integer, which may advantageously be very large, as explained hereinbelow. Moreover, this integer p may be either constant, or different from one user to another.

Thus, the table $T^U$ contains, firstly, p words $U_1, U_2, \ldots, U_p$ of m bits, where, for example, m=128, according to the desired key size (the derived value $K_r$ obtained by means of the method according to the invention having likewise a length of m bits); these words are the "values" of the nodes.

The table $T^U$ contains, secondly, for each of these values $U_j$, the corresponding "label", that is to say a word $$v^{(j)} = (v_1^{(j)}, v_2^{(j)}, \ldots, v_{l(j)}^{(j)})$$

of l(j) bits, where l(j) is a strictly positive integer, such that:

$$U_j = g_{v_{l(j)}^{(j)}} \circ \ldots g_{v_2^{(j)}} \circ g_{v_1^{(j)}}(S).$$

In this expression, S denotes a value (of m bits) termed the "master", in the sense that it is common to a certain set of users {U}; in accordance with the invention, this master value S is a secret key in the sense that its value is not disclosed to these users, for the reasons explained hereinabove. It will be noted that the labels are not necessarily stored in the table $T^U$ in the explicit form of words $v^{(j)}$, the only requirement here being to be able, on the basis of the table $T^U$, to retrieve the label associated with any value $U_j$ stored in this table.

Figure 1:
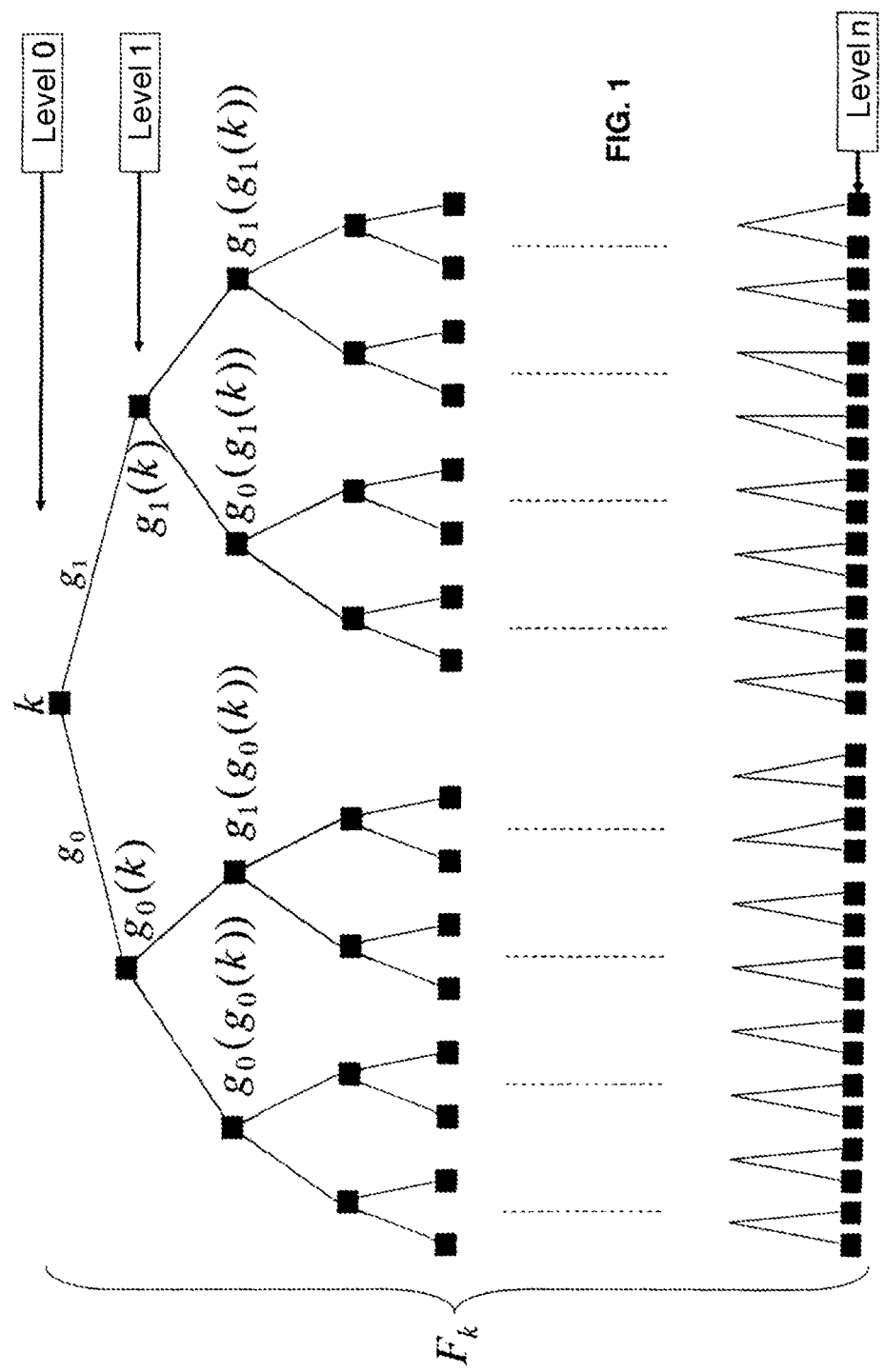
FIG. 1 is a schematic diagram illustrating the Conventional GGM construction by means of a tree.

If these nodes are represented, in accordance with FIG. 1, as situated on a tree, then the word $v^{(j)}$ represents the path to be followed from the root to reach the node concerned, and the integer l(j) represents the "level" in the tree at which the node is situated. By extension, we will also speak of node for such and such a leaf (level n) of the tree, when the value associated with this leaf is recorded in the table $T^U$. It will be noted that, preferably, the integer l(j) generally varies from one value of j to another, stated otherwise the nodes of the table are generally, preferably, situated mutually at different levels of the tree.

The tree with n levels therefore consists, for a given user U, on the one hand of p nodes, and on the other hand of branch-offs and of leaves for which no "value" is recorded in its table $T^U$.

We shall now explain the general operation of the method for obtaining a derived value according to the invention, from the point of view of a user U, by describing an embodiment. This user may, for example, be a consumer of digital data which are dispatched to him, in encrypted form, by a provider of digital data.

To be able to access these digital data, the user must implement one or more keys $K_r$, which are called "derived values" within the framework of the invention. To each leaf of the tree there corresponds a respective value of the key $K_r$. Some of these values may, if appropriate, be recorded in the table $T^U$ (case of the nodes of level n), but, generally, the derived value $K_r$ required at a given moment in order to access the digital data is obtained by means of the method according to the invention.

The steps of the present embodiment are as follows.

In step P1, the computerized platform of the user U receives, on a broadcasting channel, an input parameter r.

In step P2, the platform searches the table $T^U$ to find out whether it contains a node labeled by the word (with one bit) $v=(r_1)$ among the two branch-offs of level 1 of the tree. If such is not the case, the platform searches the table $T^U$ to find out whether it contains a node labeled by the word (With two bits) $v=(r_1,r_2)$ among the four branch-offs of level 2 of the tree. If such is not the case, the platform searches the table $T^U$ to find out whether it contains a node labeled by the word (with three bits) $v=(r_1,r_2,r_3)$ among the eight branch-offs of level 3 of the tree, and so on and so forth. This search procedure stops as soon as the platform finds in the table $T^U$, for a certain level θ, a node labeled by the word $v=(r_1, r_2, \ldots, r_j)$. There then exists an integer σ such that 1≤σ≤p, and l(σ)=θ.

In step P3, the platform reads from the table $T^U$ the corresponding value $U_\sigma$, and calculates the derived value $$K_r = g_{r_n} \circ \ldots g_{r_{\theta+1}}(U_\sigma).$$

This calculation successively implements sub-steps each employing a predetermined pseudo-random generator, which provides, in the first sub-step, the functions $g_0$ and $g_1$ of the word $U_\sigma$ and then, in the following sub-steps, the functions $g_0$ and $g_1$ of the previously calculated word of m bits. In a known manner, a pseudo-random generator can use an input word either as seed, or as initialization vector (it is recalled that an "initialization vector" is a parameter making it possible to use the same seed several times to generate several distinct pseudo-random series of numbers). At each sub-step, we choose between the word resulting from the application of the function $g_0$ and the word resulting from the application of the function $g_1$, according to the value of the bit of the input parameter r corresponding to this sub-step.

It is thus seen, on the basis of this embodiment, that the invention is advantageously designed in such a way that the users all culminate at the same derived value $K_r$ (for a given input parameter r), although these users are equipped with pairwise distinct tables $T^U$.

More precisely, each user is equipped with a different overlap of the same tree. By "overlap", is meant that, for each table $T^U$ and for any leaf, either the value $K_r$ itself associated with this leaf is recorded in the table $T^U$, or there exists a path along the tree which makes it possible to "go back" from this leaf to a node. Moreover, an overlap is said to be "without redundancy" if any leaf which is not a node is thus linked only to a single node situated at a lower level than n.

Figure 2:
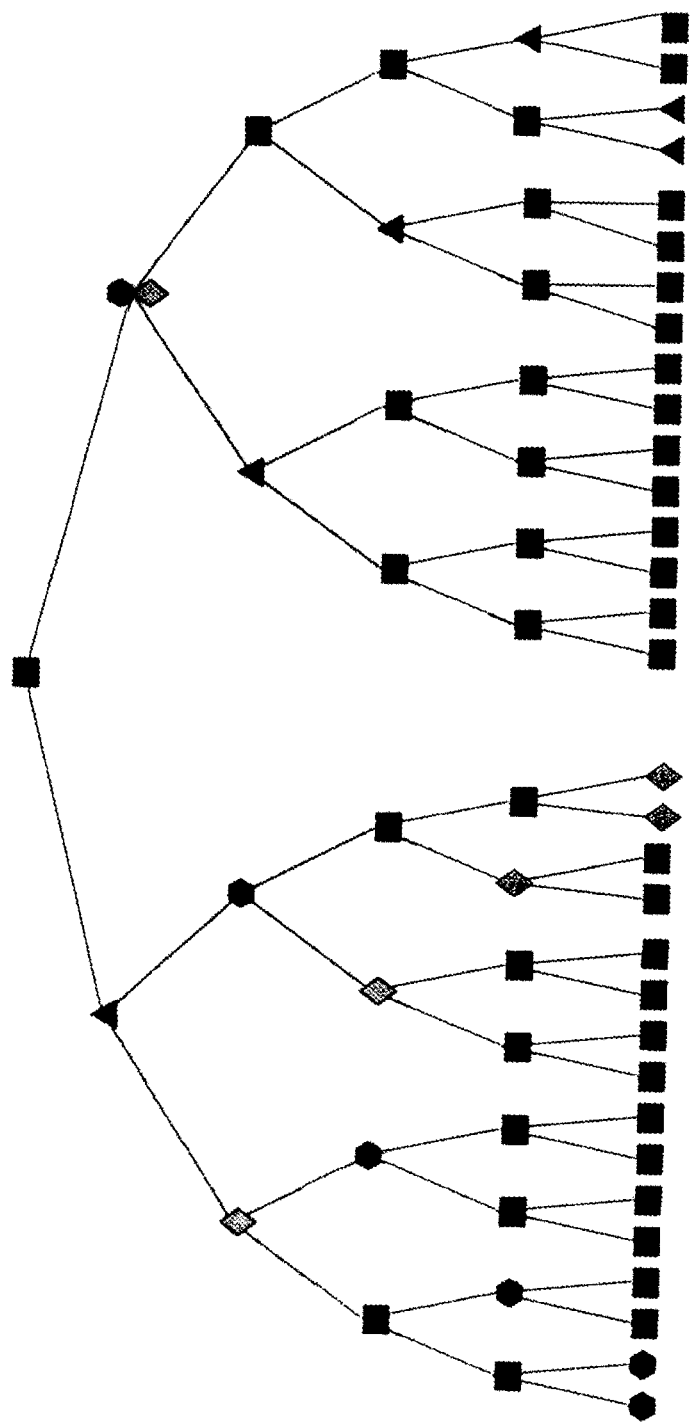
FIG. 2 represents a tree, and several possible overlaps of this tree.

This notion of overlap, different for each user, is illustrated by means of an example (provided here purely by way of illustration), represented in FIG. 2. In this example, n=5, and we consider 3 users (represented respectively by triangles, lozenges and hexagons), each furnished with an overlap without redundancy comprising p=6 nodes. For example, the labels corresponding to the hexagons are the following:
$v^{(1)}=(1)$, $v^{(2)}=(0,1)$, $v^{(3)}=(0,0,1)$, $v^{(4)}=(0,0,0,1)$, $v^{(5)}=(0,0,0,0,0)$, and $v^{(6)}=(0,0,0,0,1)$.

Each user's software is therefore identifiable by the overlap recorded in his table $T^U$ and which is specific to this user. This software is thus "branded", thereby making it possible, in the case of illicit distribution of this software, to trace the traitor who is the instigator of this distribution. The method and the system according to the invention are therefore "traceable".

We shall now briefly describe, within the framework of protection against white-box attacks, the precautions that a software designer can take to prevent a pirate, or a coalition of pirates, from modifying a piece of software according to the invention in order to evade this traceability.

It will be observed first of all that, for practical values of n and m, it is impossible for a pirate to calculate and store the whole set of derived values, in replacement for his table $T^U$. If indeed we take, let us say, n=128, then the number of leaves of the tree is equal to $2^{128}$; if, moreover, we take, let us say, m=128, then each of these leaves is associated with a respective derived value of 128 bits; storing the whole set of derived values therefore requires a capacity of $2^{135}$ bits, which greatly exceeds the capacities of current hard disks.

That said, a pirate, or a coalition of pirates, could for example calculate a table in which the nodes would be, as previously, all situated at one and the same level of the tree, but choosing a lower level than n. But as the number of branch-offs doubles each time the level increases by one unit, the pirate will, in order to do this, be able to choose only a fairly small level, having regard to the storage capacity of his platform. To prevent such a fraud, each table $T^U$ will therefore have to be designed in such a way that it comprises at least one node situated at a fairly high level of the tree (it will be noted that, because of the one-way nature of the functions $g_0$ and $g_1$, a pirate may not replace such a node by nodes situated at a lower level).

Finally, it will preferably be envisaged that access to the digital data provided by the provider requires the simultaneous use of a substantial number of derived values $K_r$ (obtained successively on the basis of a plurality of input parameters r), instead of just one. For example, access to the digital data will be able to employ the bitwise sum of several derived values, or a hash of the concatenation of several derived values. By virtue of such provisions, a pirate is prevented, in order to evade tracing, from deliberately sacrificing the nodes from which a relatively low number of leaves derive, by counting on the fact that access to the digital data will only rarely be disturbed thereby.

If such precautions are taken, it is possible, for example, to allot each user about $p=2^{15}$ nodes, all situated between, for example, levels 15 and 115 of a tree comprising n=128 levels. It is then possible to use one and the same tree to broadcast digital data to a set of users comprising, for example, a few tens of millions of individuals. With keys of m=128 bits, the memory capacity which is then required in each computerized platform (such as a decoder) to store the table $T^U$ is only about 500 kilobytes.

As indicated hereinabove, the invention is also aimed at a computer program downloadable from a communication network comprising instructions for the execution of the steps of any one of the methods according to the invention when it is executed on a computer.

This program can use any programming language, and be in the form of source code, object code, or of code intermediate between source code and object code, such as a partially compiled code, or in any other desirable form.

The information medium may be any entity or device capable of storing the program. For example, the medium can comprise a storage means, such as a ROM, for example a CD ROM or a microelectronic circuit ROM, or else a magnetic recording means, for example a diskette ("floppy disk" in English) or a hard disk.

Moreover, the information medium may be a transmissible medium such as an electrical or optical signal, which may be conveyed via an electrical or optical cable, by radio or by other means. The program according to the invention may be in particular downloaded from a network such as the Internet.

As a variant, the information medium may be an integrated circuit into which the program is incorporated, the circuit being adapted to execute or to be used in the execution of any one of the methods according to the invention.

The invention claimed is:

1. A method, carried out on a computerized platform, for decryption, the method comprising:
   receiving a cryptogram $C_r(M)$, where M is a plaintext content and $C_r$ is a predetermined encryption algorithm;
   receiving an input parameter comprising a word r of n bits related to $C_r(M)$;
   given two pseudo-random functions $g_0$ and $g_1$ from m bits to m bits obtaining, on the basis of r, a derived value $K_r$ of m bits, wherein $$K_r = g_{r_n} \circ \ldots \circ g_{r_2} \circ g_{r_1}(S),$$

where, for $i=1, \ldots, n$, $g_{r_i} = g_0$ if $r_i = 0$, and $g_{r_i} = g_1$ if $r_i = 1$, and where S is a master value of m bits, wherein S is not disclosed to said user;
   conducting a search from among a set of words of m bits $U_j$, where $j=1, \ldots, p$ recorded in a table $T^U$ and equal to $$U_j = g_{v_{l(j)}^{(j)}} \circ \ldots \circ g_{v_2^{(j)}} \circ g_{v_1^{(j)}}(S),$$

where, for $i=1, \ldots, l(j)$, the indices $v_i^{(j)}$ are predetermined bits,
   for a word $U_\sigma$ equal to $$U_\sigma = g_{r_{l(\sigma)}} \circ \ldots \circ g_{r_2} \circ g_{r_1}(S),$$

obtaining $K_r$ by calculating $$K_r = g_{r_n} \circ \ldots \circ g_{r_{l(\sigma)+1}}(U_\sigma); \text{ and}$$

decrypting $C_r(M)$ using, as a decryption key, a value obtained on the basis of at least one derived value $K_r$, so as to obtain M.

2. The method of claim 1, wherein said computerized platform uses as secret key for authentication with a verificator entity a value that may be obtained on the basis of the at least one derived value $K_r$, the latter being calculated by the obtaining and conducting steps, after reception of r.

3. A device for decryption, the device comprising:
   a memory that stores a computer program;
   a central processing unit that executes the computer program to perform steps comprising:
   receiving an input parameter comprising a word r of n bits related to $C_r(M)$;
   producing two pseudo-random functions $g_0$ and $g_1$ from m bits to m bits, and making it possible to obtain, on the basis of r, a derived value $K_r$ of m bits, wherein $$K_r = g_{r_n} \circ \ldots \circ g_{r_2} \circ g_{r_1}(S),$$

where, for $i=1, \ldots, n$, $g_{r_i} = g_0$ if $r_i = 0$, and $g_{r_i} = g_1$ if $r_i = 1$, and where S is a master value of m bits, wherein said master value S is not disclosed to said user, said device being configured for:
   receiving a cryptogram $C_r(M)$, where M is a plaintext content and $C_r$ is a predetermined encryption algorithm;
   searching, from among a set of words of m bits $U_j$, where $j=1, \ldots, p$, recorded in a table $T^U$ and equal to $$U_j = g_{v_{l(j)}^{(j)}} \circ \ldots \circ g_{v_2^{(j)}} \circ g_{v_1^{(j)}}(S),$$

where, for $i=1, \ldots, l(j)$, the indices $v_i^{(j)}$ are predetermined bits,
   for a word $U_\sigma$ equal to $$U_\sigma = g_{r_{l(\sigma)}} \circ \ldots \circ g_{r_2} \circ g_{r_1}(S),$$

obtaining said derived value $K_r$ by calculating $$K_r = g_{r_n} \circ \ldots \circ g_{r_{l(\sigma)+1}}(U_\sigma); \text{ and}$$

decrypting $C_r(M)$ using, as a decryption key, a value obtained on the basis of at least one derived value $K_r$, so as to obtain M.

4. An electronic circuit, comprising the device as claimed in claim 3.

5. A decoder, comprising an electronic circuit as claimed in claim 4.

6. A non-transitory computer-readable medium having stored thereon a computer program that is downloadable from a communication network, the computer program comprising instructions for the execution of the method as claimed in claim 1.

7. A non-transitory computer-readable medium having stored thereon a computer program that is downloadable from a communication network, the computer program comprising instructions for the execution of the method as claimed in claim 2.

* * * * *